(12) United States Patent
Meuleman et al.

(10) Patent No.: US 9,586,174 B2
(45) Date of Patent: Mar. 7, 2017

(54) PROCESS FOR CAPTURING ACID GASES

(75) Inventors: Erik Everhardus Bernardus Meuleman, Bentleigh East (AU); Graeme Puxty, Mayfield (AU); Paul Feron, Floraville (AU)

(73) Assignee: Commonwealth Scientific and Industrial Research Organisation (AU)

( * ) Notice: Subject to any disclaimer, the term of this patent is extended or adjusted under 35 U.S.C. 154(b) by 502 days.

(21) Appl. No.: 13/980,161

(22) PCT Filed: Jan. 18, 2012

(86) PCT No.: PCT/AU2012/000033
§ 371 (c)(1),
(2), (4) Date: Jul. 17, 2013

(87) PCT Pub. No.: WO2012/097406
PCT Pub. Date: Jul. 26, 2012

(65) Prior Publication Data
US 2013/0291724 A1    Nov. 7, 2013

(30) Foreign Application Priority Data
Jan. 18, 2011 (AU) ................................ 2011900159

(51) Int. Cl.
*B01F 3/04* (2006.01)
*B01D 53/14* (2006.01)
(52) U.S. Cl.
CPC ..... *B01D 53/1406* (2013.01); *B01D 53/1456* (2013.01); *B01D 53/1475* (2013.01);
(Continued)
(58) Field of Classification Search
USPC ......................................................... 95/186
See application file for complete search history.

(56) References Cited

U.S. PATENT DOCUMENTS

| 2,435,089 A * | 1/1948 | McCartney | .......... B01D 53/526 423/228 |
| 2004/0253159 A1 | 12/2004 | Hakka et al. | |

FOREIGN PATENT DOCUMENTS

| FR | 2 961 115 A1 | 12/2011 |
| JP | 10-244120 A | 9/1998 |

(Continued)

OTHER PUBLICATIONS

International Search Report for International Patent Application No. PCT/AU2012/000033 (mailed Mar. 7, 2012).

(Continued)

*Primary Examiner* — Duane Smith
*Assistant Examiner* — Adam W Bergfelder
(74) *Attorney, Agent, or Firm* — Merchant & Gould P.C.

(57) ABSTRACT

An absorption column 1 for separating $CO_2$ and a second acid gas from a gas stream, the column comprising a first and second section (4, 5) for the absorption of $CO_2$ and the second acid gas; a solvent inlet in the second section for the addition of liquid stream 3 including an absorbent liquid for $CO_2$ and the second acid gas; a gas inlet (21) in the first section for the addition of a gas stream (2) containing $CO_2$ and the second acid gas; a gas outlet (15) in the second section of the column; a first solvent outlet (22) for the removal of at least a portion of the solvent (6) from the second section of the column and a second solvent outlet (23) for solvent stream (11) from the first section of the column; and a liquid flow distributor arrangement (8) to allow a portion of the solvent to flow from the second section of the column to the first section. A method of operating the apparatus and method of solvent extraction is also disclosed.

9 Claims, 4 Drawing Sheets

Figure 1:
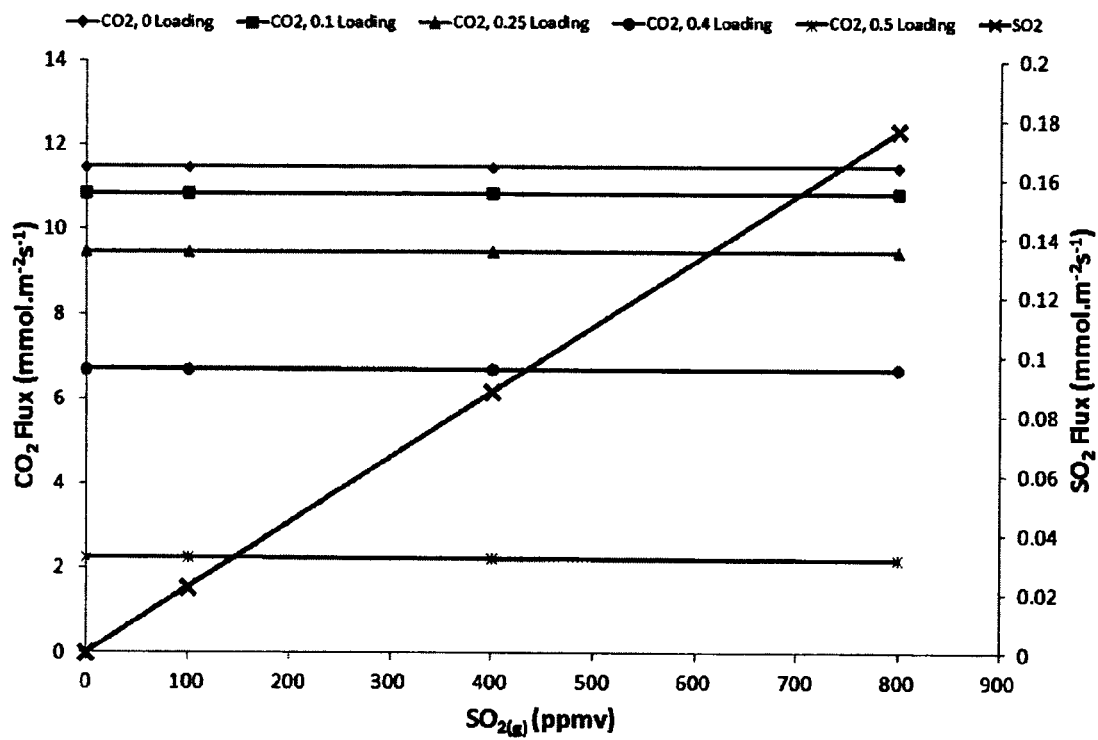

(52) U.S. Cl.
CPC .... *B01D 53/1462* (2013.01); *B01D 2252/204* (2013.01); *B01D 2252/20484* (2013.01); *B01D 2252/20489* (2013.01); *B01D 2257/2045* (2013.01); *B01D 2257/2047* (2013.01); *B01D 2257/302* (2013.01); *B01D 2257/304* (2013.01); *B01D 2257/404* (2013.01); *B01D 2257/504* (2013.01); *B01D 2258/0283* (2013.01); *Y02C 10/04* (2013.01); *Y02C 10/06* (2013.01)

(56) References Cited

FOREIGN PATENT DOCUMENTS

| | | |
|---|---|---|
| JP | 2006-527153 A | 11/2006 |
| JP | 2009-226365 A | 10/2009 |
| WO | WO 00/74816 A1 | 12/2000 |
| WO | WO 2009/091437 A1 | 7/2009 |

OTHER PUBLICATIONS

Puxty et al., "Modeling $CO_2$ Mass Transfer in Amine Mixtures: PZ-AMP and PZ-MDEA", *Environ Sci & Technol*, 45: 2398-2405 (2011).

Puxty et al., "Comparison of the rate of $CO_2$ absorption into aqueous ammonia and monoethanolamine", *Chem. Eng. Sci*, 65: 915-922 (2010).

Japanese Office Action for Japanese Patent Application No. 2013-549675 (mailed Jul. 7, 2015).

\* cited by examiner

PROCESS FOR CAPTURING ACID GASES

This application is a U.S. National Stage Application under 35 U.S.C. §371 of International Patent Application No. PCT/AU2012/000033 filed 18 Jan. 2012, which claims the benefit of priority to Australian Patent Application No. 2011900159 filed 18 Jan. 2011, the disclosures of all or which are incorporated by reference herein in their entireties. The International Application was published in English on 26 Jul. 2012 as WO 2012/097406. To the extent appropriate, a claim of priority is made to each of the above disclosed applications.

FIELD OF THE INVENTION

This invention relates to the capture of $CO_2$ and at least one other acidic gas from gas streams by reactive chemical absorption. In particular, the invention relates to a process and apparatus which allows both $CO_2$ and at least one other acidic gas to be captured using a single solvent stream in a single absorber column.

BACKGROUND OF THE INVENTION

While the invention will be described with reference to $CO_2$ and $SO_2$, it may be equally applicable to gas streams containing $CO_2$ and other sulfurous acid gases such as $H_2S$, or other acidic gases which form stronger acids than $CO_2$ such as HF, HCl and $NO_2$.

There is growing pressure for stationary producers of greenhouse gases to dramatically reduce their atmospheric emissions. Of particular concern is the emission of carbon dioxide ($CO_2$) into the atmosphere. One method of reducing atmospheric $CO_2$ emissions is through its capture at a point source and subsequent storage in geological or other reservoirs.

The process for capturing $CO_2$ from power station and other combustion device flue gases is termed post combustion capture (PCC). In post combustion capture, the $CO_2$ in flue gas is first separated from nitrogen and residual oxygen using a suitable solvent in an absorber. The solvent is usually an aqueous basic mixture containing components undergoing a chemical reaction with acid gases such as $CO_2$. It might contain amines (e.g. alkanolamines, ammonia, alkylamines) and/or inorganic salts (e.g. carbonate or phosphate). The $CO_2$ is subsequently removed from the solvent in a process called stripping (or regeneration), thus allowing the solvent to be reused. The stripped $CO_2$ is liquefied by compression and cooling, with appropriate drying steps to prevent hydrate formation. PCC in this form is applicable to a variety of stationary $CO_2$ sources including power stations, steel plants, cement kilns, calciners and smelters.

When $CO_2$ is absorbed into an aqueous solution a number of reactions can occur. They are shown by the following equations where (1) is hydration of gaseous $CO_2$, (2) is the reaction of $CO_2$ with water to form carbonic acid, (3) is the reaction of $CO_2$ with hydroxide to form bicarbonate and (4) and (5) are the carbonic acid-bicarbonate-carbonate acid-base equilbria.

(1)

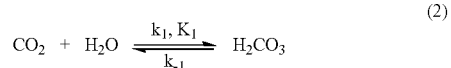

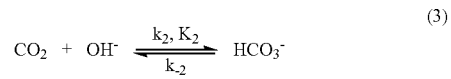

If an amine, or multiple amines, are present in solution a number of additional reactions may occur. If the amine is a sterically free primary or secondary amine such as monoethanolamine (MEA) or diethanolamine (DEA) the following reactions can occur between $CO_2$ and each amine. Equation (6) is the formation of a carbamate species via a nitrogen-carbon bond formation between the amine and $CO_2$. This is generally the kinetically fastest reaction of those that occur with $CO_2$. Equation (7) is the amine acid-base equilibrium. For polyamines the reactions of equation (6) and (7) may occur for each nitrogen. For sterically hindered and tertiary amines only the acid-base equilibrium of equation (7) occurs.

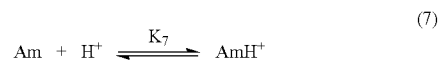

Combustion devices that utilise fuel containing sulfur (such as coal and oil) also produce sulfur dioxide ($SO_2$) as a combustion product in their flue gas. In untreated flue gas from coal fired power stations, the largest source of $CO_2$ emissions globally, the $SO_2$ content varies between 100-5000 ppmv. In other off-gases such as those of smelters, the $SO_2$-content might reach levels in excess of 10%. $SO_2$ emissions have long been recognised as the primary cause of acid rain and the subsequent environmental degradation that results. As a consequence flue gas desulfurisation (FGD) technology was developed to capture the $SO_2$ from combustion flue gas prior to its emission to the atmosphere. FGD is utilised primarily in the USA, Europe, Japan and increasingly in China. After FGD the sulfur content is usually reduced to levels between 10 and 100 ppm, depending on the particular FGD technology used, the original sulfur content in the coal and the legislative requirements for sulfur content in the remaining flue gases.

As $SO_2$ and $CO_2$ are both acid gases, with $SO_2$ being a significantly stronger acid, the presence of $SO_2$ in flue gas degrades the performance of $CO_2$ capture. When $SO_2$ is absorbed into an aqueous solution analogous reactions occur to those for $CO_2$. Equation (8) is hydration of gaseous $SO_2$, equation (9) is the formation of sulfurous acid, equation (10) is the formation of bisulfate and equations (11) and (12) are the sulfurous acid-bisulfite-sulfite acid-base equilibria. The oxidation of sulfite to sulfate, which may occur in the presence of molecular oxygen, has not been included as its small reaction rate means it has no impact upon the invention described herein.

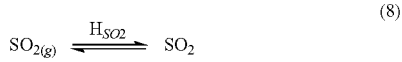 (8)

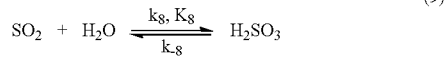 (9)

 (10)

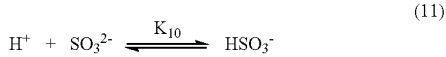 (11)

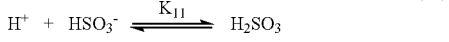 (12)

However, unlike $CO_2$, $SO_2$ does not react directly with amines present in solution. The other significant difference is that $SO_2$ is a much stronger acid and is absorbed much more rapidly than $CO_2$. The $pK_a$'s of bisulfite and sulfurous acid are 7.17 and 1.85 respectively at 25° C., compared to 10.3 and 3.34 for bicarbonate and carbonic acid. Also the reaction rate constant of $SO_2$ and water is almost two orders of magnitude larger than the largest known rate constant for $CO_2$ reacting with an amine, which is its reaction with piperazine (PZ). Considering water is present at a much larger concentration than any amine the overall rate of reaction for $SO_2$ will be greater still.

The physical solubility of $SO_2$ in an aqueous solution is over an order of magnitude larger than $CO_2$. The Henry coefficient at 25° C. (defined as the gas phase partial pressure over the liquid phase concentration of the gas, $$H_i = \frac{P_i}{c_i}$$

for $SO_2$ is 82.46 KPa·L·mol$^{-1}$ while for $CO_2$ it is 3265 kPa·L·mol$^{-1}$. They both share similar diffusion coefficients. The combination of greater physical solubility, faster reaction rate and greater acidity means that when both $CO_2$ and $SO_2$ are simultaneously present in flue gas $SO_2$ is absorbed preferentially to and more rapidly than $CO_2$. This is the case even if the gas phase concentration of $SO_2$ is significantly lower than $CO_2$.

Modelling of $CO_2$ and $SO_2$ absorption into a falling thin film of aqueous MEA has been completed to illustrate this selectivity. A falling thin film is the type of hydrodynamic environment found in packed columns commonly used for $CO_2$ capture applications where a liquid film falls under gravity over packing material and is counter-currently contacted with a gas stream. Chemical diffusion and reaction in a thin film has been modelled by solving the appropriate partial differential equations and simultaneous equations needed to describe the reactions between aqueous MEA, $CO_2$ and $SO_2$. The method is described in detail in G. Puxty and R. Rowland, *Env. Sci. Technol.* 2011, 45, 2398-2405. FIG. 1 is a plot showing the impact of gas phase $SO_2$ concentration on the $CO_2$ absorption flux into a thin film of 30% w/w aqueous MEA at 40° C. as determined by modelling (filled markers). The gas phase $CO_2$ concentration was 10 kPa and exposed to the film for 0.3 seconds, the liquid $CO_2$ loading (mol $CO_2$/mol MEA) was varied between 0-0.5 and the gas phase $SO_2$ concentration between 0-800 ppmv. The conditions for the modelling were chosen to be similar to those used for experimental validation of the patent concept, as described in the next paragraph. In all cases as the $SO_2$ concentration increases the $CO_2$ absorption flux is very slightly reduced. This is due to the preferential absorption of $SO_2$ and the associated acidification of the solution. This effect is most pronounced if the solvent is loaded with $CO_2$, as would be the case in real operation. Also shown is the $SO_2$ absorption flux, which is observed to increase linearly with increasing $SO_2$ concentration in the gas phase. This indicates that the rate of chemical reaction with $SO_2$ is so fast that its absorption flux is entirely controlled by the gas side.

Figure 2:
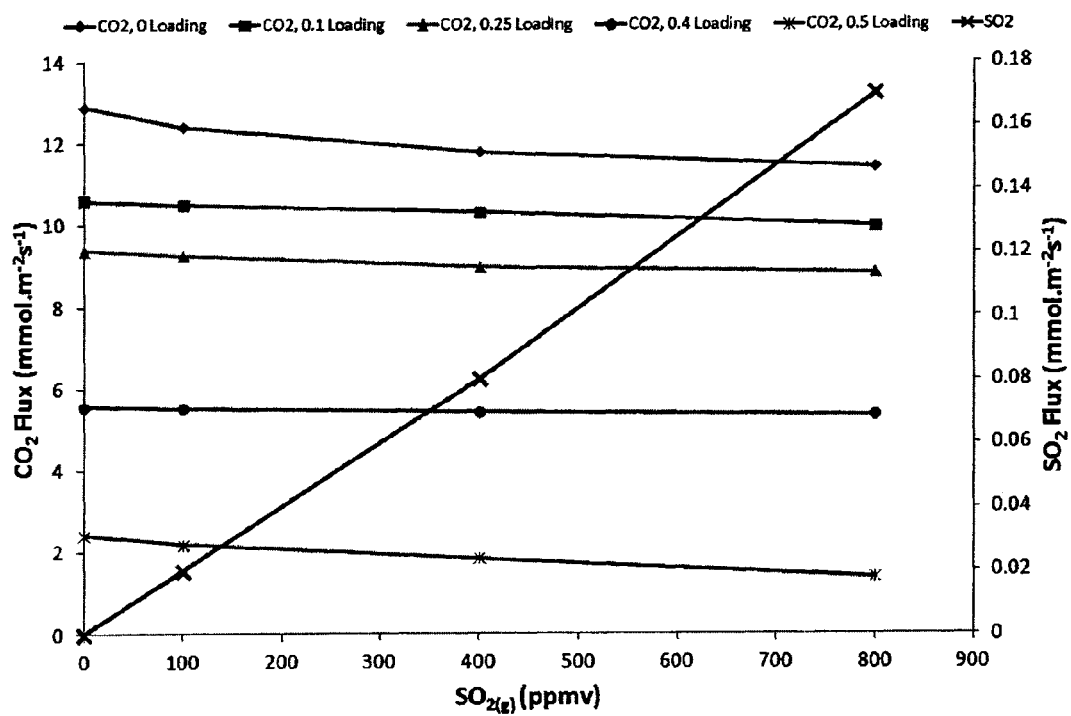
Figure 3:
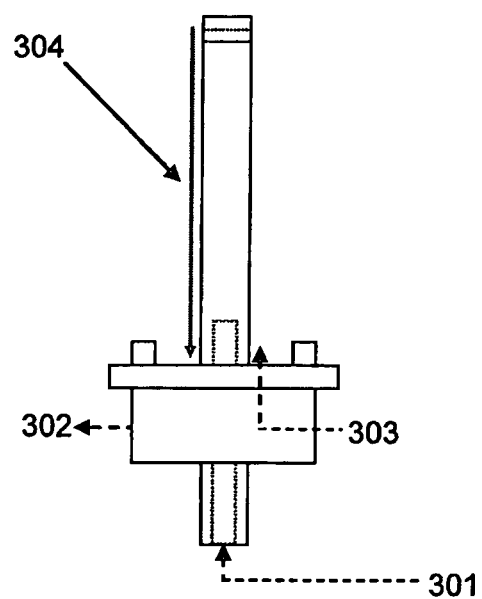

FIG. 2 is a plot of measurements of the impact of gas phase $SO_2$ on the $CO_2$ absorption flux into 30% aqueous MEA at 40° C. These measurements were made using the wetted-wall contactor shown in FIG. 3. FIG. 3 shows a wetted-wall contactor comprising a liquid inlet (301), a liquid outlet (302), a gas inlet (303), and a thin liquid film (304). A detailed description of this apparatus is given in G. Puxty, R. Rowland and M. Attalla, *Chem. Eng. Sci.* 2010, 915-922 and it was used as described with the following modifications: the addition of $SO_2$ as a feed gas; use of 2 mol·dm$^{-3}$ $H_2SO_4$ in the saturator; and the addition of an $SO_2$ gas analyser. A 1 dm$^3$ min$^{-1}$ inlet gas stream containing 10 kPa $CO_2$, 0-800 ppmv $SO_2$ and the remainder $N_2$ was contacted with at 40° C. with falling thin liquid film flowing at 121.4 cm$^3$ min$^{-1}$. The concentration of $CO_2$ and $SO_2$ in the outlet gas stream was measured using the gas analyser and the absorption fluxes determined. The liquid $CO_2$ loading was varied between 0-0.5. This apparatus mimics the gas-liquid contacting of packed columns typically used for gas absorption processes. As can be observed the behaviour is consistent with the results predicted from modelling for both $CO_2$ and $SO_2$. As the $SO_2$ concentration increases in the gas-phase the $CO_2$ absorption flux is slightly reduced. The selectivity for $SO_2$ absorption is further confirmed by the fact that the $SO_2$ content in the exiting gas stream was below the detection limit of the gas analyser, even when the absorbent had the highest $CO_2$ loading of 0.5. Also the $SO_2$ absorption flux remains unchanged with increasing $CO_2$ loading of the solvent. This demonstrates experimentally the basis of the invention. That is, even when exposed to a high concentration of $CO_2$ in the gas stream (relative to $SO_2$) and the solvent is saturated with $CO_2$ (a $CO_2$ loading of 0.5 for MEA), the solvent remains selective for $SO_2$ and absorbs it at the same flux as when the solvent is $CO_2$ free.

As a result of the $SO_2$ degrading the performance of $CO_2$ capture, a restriction of existing PCC technology is that the $SO_2$ content of flue gas must be reduced to less than 10 ppmv before its application. Levels below 10 ppm are normally not achieved in existing flue gas desulfurisation plants and the use of an additional wash step is needed, adding significantly to the investment costs.

For countries such as Australia, where no FGD is applied, the $SO_2$ content of flue gas poses a serious barrier to the use of PCC technology. In such locations FGD must first be installed before $CO_2$ capture can be undertaken, significantly increasing the cost and technical complexity of the process. The most widely practiced FGD technology is based on the use of calcium carbonate slurries to eventually provide a saleable gypsum (calcium sulfate) product. This technology is used in power stations and has a wide range of technology suppliers (eg. Alstom, Babcock-Wilcox, Chiyoda). In some applications a regenerative solvent technology is used, providing a pure $SO_2$ product. CANSOLV Technologies Inc has developed an amine based technology for combined removal of $CO_2$ and $SO_2$ (WO2006/136016). The process uses two different amine based solvents in separate liquid loops which are heat integrated in the separate solvent regeneration steps. The absorption of $SO_2$ and $CO_2$ is performed in the same absorber.

There exists a need for a simple and low cost $CO_2$ capture technology or process that can tolerate the typical levels of $SO_2$ present in untreated flue gas from sulfur containing combustion sources but also from flue gases exiting a typical flue gas desulfurisation process.

It is an object of the present invention to overcome or at least alleviate one or more of the problems associated with the prior art.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

Accordingly, in one aspect the present invention provides a process for removing $CO_2$ and a second acid gas from a gas stream including the steps of providing a gas stream containing $CO_2$ in the range of about 1 to about 30 vol %, and a second acid gas to an absorption column, the absorption column having at least separate first and second sections, the gas stream being provided to the first section of the column providing an absorbent liquid for $CO_2$ and the second acid gas to the second section to flow counter current to the gas stream, the solvent passing through the second section and the first section of the column with at least a portion of the solvent being removed from the absorption column prior to the first section, passing the gas stream through the absorption column preferentially absorbing the second acid gas into the solvent in the first section of the absorption column before passing to the second section of the absorption column where $CO_2$ is absorbed into the solvent, recovering gas depleted in $CO_2$ and the second acid gas from the second section of the column.

An advantage of the invention is the ability for the same solvent to be used to strip both $CO_2$ and second acid gas from the gas stream.

Preferably, a liquid flow distributor exists between the second and first sections of the absorption column. In one embodiment, the liquid flow distributor prevents liquid from flowing directly between the second and first sections of the column. In this embodiment, all of the solvent is removed from the first section and a further portion of the solvent split from this stream and returned to the second section of the absorption column.

Preferably $CO_2$ is present in the flue gas in the range of about 3 to about 30 vol %, and most preferably in the range of about 8 to about 14 vol %.

Preferably, the solvent stream entering the first section of the column has a $CO_2$ content of between about 0 and about 200% of the saturated $CO_2$ content. More preferably, the $CO_2$ content is between about 30 and about 150% of the saturated $CO_2$ content. Most preferably, the $CO_2$ content is between about 80 and about 120% of the saturated $CO_2$ content.

It is preferred that the solvent is an aqueous solution comprising any aqueous amine, ammonia or mixture thereof. A non-limiting disclosure of suitable types of amines includes: primary, secondary, tertiary, sterically hindered, acyclic, cyclic, mono and poly amines, alkanolamines and amino acids. The amino acids may contain sulfonic, carbonic and phosphonic acid groups. A non-limiting disclosure of suitable amine compounds includes: Monoethanolamine (MEA), piperazine (PZ), 2-amino-2-methyl-propanol (AMP), methyldiethanolamine (MDEA), diethanolamine (DEA), piperidine, 1-piperidinemethanol, 2-piperidinemethanol, 3-piperidinemethanol, 4-piperidinemethanol, 1-piperidineethanol, 2-piperidineethanol, 3-piperidineethanol, 4-piperidineethanol, taurine, glycine, sarcosine.

In another embodiment of the invention, the liquid flow distributor between the first and second section allows liquid to flow directly from the second section to the first section but at a restricted flow rate causing the liquid to hold up in the first section. A portion of the solvent, preferably equivalent to the hold up, is removed from the column and the remainder passes through the distributor to the first section of the column.

A further embodiment may involve a combination of the above embodiments in which a solvent flow distributor allows some flow and a portion of the removed solvent is returned to the second section.

The solvent removed prior to the first section (i.e. after passing through the second section) is $CO_2$ rich but has not had contact with gas rich in the second acid gas and so has not absorbed much, if any of the second acid gas. This removed solvent stream is subsequently processed to remove the $CO_2$ before being returned to the absorption column.

As the second acid gas is absorbed into the solvent in the first section the solvent being removed from the first section of the column is rich in the second acid. This solvent stream may subsequently be processed to remove the second acid gas and then returned to the absorption column.

Preferably the second acid gas is selected from the group of $SO_2$, $H_2S$, HF, HCl and $NO_2$. The second acid gas is more preferably a sulfurous acid gas such as $SO_2$ and $H_2S$ and most preferably $SO_2$.

It is preferred that when the second acid gas is $SO_2$, and that the $SO_2$ is present in the flue gas in the range of about 1 to about 100,000 ppm, more preferably in the range of about 1 to about 10,000 ppm, and most preferably in the range of about 1 to about 1,000 ppm.

In another aspect of the invention, there is provided an absorption column for separating $CO_2$ and a second acid gas from a gas stream, the column comprising a first and second section for the absorption of $CO_2$ and the second acid gas;

a solvent inlet in the second section for the addition of a absorbent liquid for $CO_2$ and the second acid gas;

a gas inlet in the first section for the addition of a $CO_2$ and the second acid gas containing gas stream;

a gas outlet from the second section of the column;

a first solvent outlet for the removal of at least a portion of the solvent from the second section of the column and a second solvent outlet from the first section of the column; and a liquid flow distributor arrangement to allow a portion of the solvent to flow from the second section of the column to the first section.

In a preferred form of this aspect of the invention, the flow distributor arrangement comprises a flow restrictor which allows a restricted flow of solvent from the second section to the first section while gas is able to continue up the column between the sections. The flow restrictor may be a simple orifice or perforated plate which prevents all of the solvent flowing down the column to flow directly into the first section or the column. The difference between the solvent flowing through the second section and that entering the first is removed through the first solvent outlet. The flow distributor might also be derived from sieve trays, bubble cap trays or valve trays which are commonly used in gas/liquid contactors. These tray designs can be modified to ensure that the desired liquid flow distribution is achieved.

Alternatively the flow distributor arrangement prevents all of the solvent from flowing directly from the second section to the first section while allowing gas to pass through. The solvent is removed from the second section and a stream including a portion of the solvent diverted to the first section of the column.

In a further preferred aspect, the first section of the apparatus also acts as a quench to cool the flue gas from an initial temperature in the range of about 80 to about 180° C., to a lower temperature in the range of about 20 to about 60° C. It is preferred that the initial temperature is in the range of about 80 to about 120° C.; and most preferably the temperature is about 80° C. It is preferred that quench cools the flue gas to a temperature in the range of about 30 to about 50° C.; and most preferably to a temperature of about 40° C.

The solvent removed prior to the first section is $CO_2$ rich but has not had contact with gas rich in the second acid gas and so has not absorbed much, if any of the second acid gas. This removed solvent stream is subsequently passed to a $CO_2$ regeneration unit where the solvent is processed to remove the $CO_2$ before being returned to the absorption column.

As the second acid gas is absorbed into the solvent in the first section and $CO_2$ desorbed, the solvent being removed from the first section of the column is rich in the second acid gas and $CO_2$ lean. This solvent stream may subsequently pass to a recovery unit for the second acid gas where the solvent is processed to remove the second acid gas and then returned to the absorption column.

Preferably the second acid gas used in the apparatus is selected from the group of $SO_2$, $H_2S$, HF, HCl and $NO_2$. The second acid gas is more preferably a sulfurous acid gas such as $SO_2$ and $H_2S$ and most preferably $SO_2$.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS/FIGURES

Figure 4:
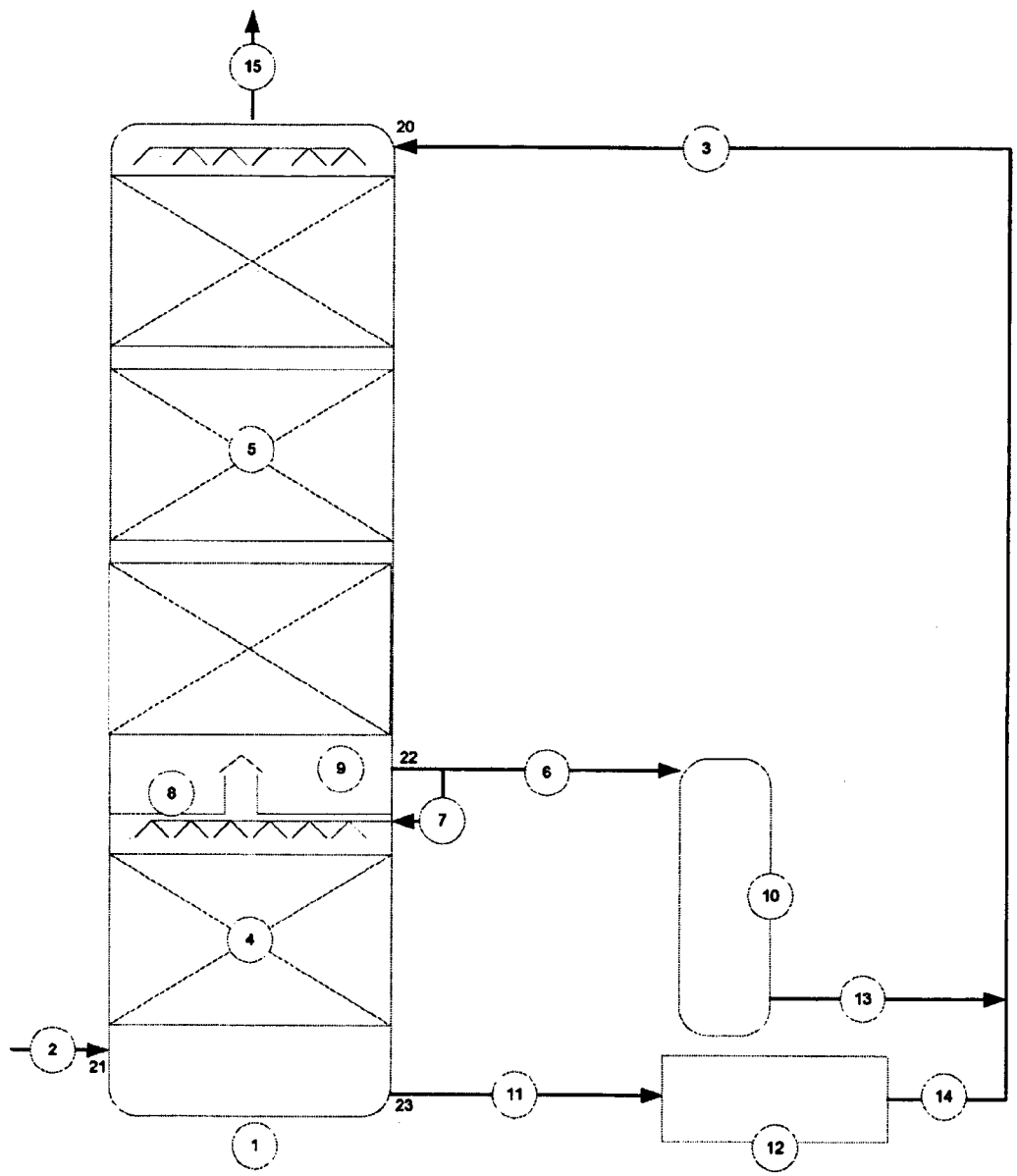

FIG. 1 is a graph showing the impact of gas phase $SO_2$ concentration on the $CO_2$ absorption flux into a thin film of 30% w/w aqueous MEA at 40° C. as determined by modelling; and FIG. 2 is a graph showing the impact of gas phase $SO_2$ concentration on the $CO_2$ absorption flux into a thin film of 30% w/w aqueous MEA at 40° C. as determined by experiment; and FIG. 3 is an illustration of the wetted-wall contactor used to experimentally determine the $CO_2$ and $SO_2$ absorption flux into a falling thin liquid film of 30% w/w MEA; and FIG. 4 is a schematic diagram of an embodiment of the invention which would allow $CO_2$ and $SO_2$ removal from a single absorber column and single solvent stream.

DETAILED DESCRIPTION OF THE EMBODIMENTS

While the invention will be described with reference to $CO_2$ and $SO_2$ gases, it is intended that the invention is equally applicable to $CO_2$ in the presence of a second acid gas where the acid formed is a stronger acid than that formed from $CO_2$. These include $SO_2$, $H_2S$, $NO_2$, HF and HCl.

The present invention is a process that allows both $CO_2$ and $SO_2$ removal from a gas stream using a single absorber tower and single aqueous solvent. The invention utilises the differences in physical solubility, absorption rate and acidity of $CO_2$ and $SO_2$ to achieve this.

A schematic diagram of the process is shown in FIG. 4. Flue gas (2) enters at the bottom of a packed absorber column (1). The design of the column (1) itself may be similar in design to those in existing use for gas treating processes.

The absorption column (1) for separating $CO_2$ and a second acid gas from a gas stream, the column includes a first and second section (4, 5) for the absorption of $CO_2$ and the second acid gas and a liquid flow distributor (8). The second section (5) includes a solvent inlet (20) for the addition of liquid stream (3) including an absorbent liquid for $CO_2$ and the second acid gas, a gas outlet (15) and a first solvent outlet for the removal of at least a portion of the solvent as stream (6) from the second section (5) of the column.

First section (4) includes a gas inlet (21) for the addition of a gas stream (2) containing $CO_2$ and the second acid gas and a second solvent outlet (23) for solvent stream (11) from the first section of the column. The liquid flow distributor arrangement (8) is provided with a liquid distributor to allow a portion of the solvent to flow from the second section of the column to the first section.

An aqueous solvent, suitable for $CO_2$ capture such as but not limited to an aqueous amine, lean in $CO_2$ and $SO_2$ enters at the top of the absorber column (liquid stream 3). As the gas stream moves up the column $SO_2$ absorption occurs in the bottom first section (4). This first section (4) of column (1) may also act as a quench to cool the flue gas to a temperature suitable for $CO_2$ capture (~40° C.) from its original temperature (normally above 80° C.). This first section (4) of column (1) is exposed to a stream (7) of absorbent liquid. Stream (7) is a side stream comprising a small portion of the solvent stream (6). Solvent stream (6) is the result of contact with the gas stream in top second section (5) of the absorption column, now $CO_2$ rich, which originally entered at the top of the absorber as solvent stream (3). Even though the solvent is $CO_2$ rich effective $SO_2$ removal still occurs in first section (4) due to the selectivity for $SO_2$. Some $CO_2$ desorption may also occur at this point increasing the $CO_2$ content of the gas stream. The $SO_2$ lean gas stream then moves into the mid and upper second sections (5) of the column.

In mid and upper second sections (5) of the column $CO_2$ absorption occurs as in a traditional $CO_2$ capture process. At the interface between the second section (5) of the column and the bottom section, a flow distributor arrangement (8) is shown which allows gas to continue to rise up the column while restricting the flow of solvent down the column. The solvent progressing down the column (1) after passing through the second section (5) is the now $CO_2$ rich and the $SO_2$ lean solvent. This solvent at the base (9) of the second section is removed and a return stream (7) which is a small portion of stream (6) returned to the first section of the column (1).

The flow distributor arrangement (8) may also take the form of a restrictor such as a sieve plate or orifice (not shown) which allows gas to pass upwardly in the column from the first section (4) to the second section (5) while allowing a small amount of solvent to continue down the column (1). The flow restrictor causes a hold up in the solvent at the base of the second section equivalent to the difference to the solvent flow through the second and first sections (5, 4) which is removed from the column 1 in a stream similar to stream 6.

Solvent stream 6 then passes to a $CO_2$ regeneration unit (10) for $CO_2$ stripping and solvent regeneration.

As mentioned above, a portion of the solvent which has passed through the second section (5) of the column passes into the bottom first section (4) of the column where $SO_2$ removal occurs. The fraction of the remainder of the total process liquid stream 3 needed to provide bulk capture of $SO_2$ will depend on the ratio of $SO_2/CO_2$ content in the flue gases and typically will range between 0.1% and 3% of the total process stream needed for $CO_2$ capture. Given this much reduced flow, it may be desirable to recirculate the solvent in the first section (4) multiple times in the first section (4) of the column to provide adequate contact. Alternatively a dedicated gas/liquid contactor able to operate at high gas/liquid ratios, such as a membrane contactor, might be used.

The fraction of the process stream (6) used for selective $SO_2$ absorption might also be obtained as a product stream from a separation step, which will result in partial rejection of amines, thus preventing them from entering the bottom part of the absorber. This will avoid excessive oxidation in the bottom ($SO_2$-removal) stage of the absorber. The $SO_2$ rich solvent (11) from the first section (4) of the column is then removed and passed to an $SO_2$ regeneration unit (12) for sulfur recovery and solvent regeneration. The regenerated solvent streams (13, 14) are then mixed and returned to the top of the absorber as process stream (3).

In an alternative embodiment (not shown), at least a portion of the $SO_2$ rich solvent stream (11) may be recycled and added to the top of first section (4) with solvent stream (7). The recycle of the $SO_2$ rich solvent stream (11) potentially will provide some cost and performance benefits, by increasing the concentration of $SO_2$ in solvent stream (11).

$CO_2$ stripping and solvent regeneration for the $CO_2$ rich and $SO_2$ lean solvent stream carried out in $CO_2$ regeneration unit (10) uses a standard $CO_2$ stripping process. A general description of a $CO_2$ stripping process follows, however this does not preclude the use of any other $CO_2$ stripping process. The solvent stream exiting the absorber is preheated (generally via a heat exchange with the lean $CO_2$ solvent stream from the stripper bottom) and enters the top of a packed column. At the base of the column liquid is heated to 120-160° C. via a reboiler to generate stripping steam and heat the solvent. The solvent entering at the top of the column is contacted with and heated by the stripping steam. At this elevated temperature, the $CO_2$ absorption process is reversed and $CO_2$ comes out of solution. The gaseous $CO_2$ stream passes upwards through the column and exits through the top for further purification and compression for transport. The $CO_2$ lean solvent stream is removed from the bottom of the column, cooled via heat exchange, and returned to the absorber.

Sulfur recovery and solvent regeneration of the $SO_2$ rich stream (11) may be carried out using a sulfur recovery process suitable for use with aqueous amines. Due to oxidation of sulfite species as a result of the presence of oxygen in the flue gas both sulfites and sulfates may be present in this stream. Options include but are not limited to: metathesis via the addition of $NaOH/NaCO_3$ or other hydroxides/carbonates to form $Na_2SO_{3(s)}$ and $Na_2SO_{4(s)}$ precipitates or others; ion exchange resins to separate sulfites and sulfates from other species; and membrane electrodialysis to separate sulfites and sulfates from other species. The sulfur recovery step might also beneficially be integrated with the amine reclaimer. The reclaimer might be a distillation column in which the amine is recovered as the overhead product as a result of its higher volatility. Degradation products, heat stable salts, including sulfur products will then be left in the bottom fraction of the distillation column. Alternatively, as is the case for non-volatile amines, the amine reclaimer might be based on the removal of degradation products and heat stable salts via a combination of electrodialysis, filtration, adsorption and ion-exchange. These steps can also be used to remove the sulfur products.

The present invention provides an improved $CO_2$ capture process for $SO_2$ containing flue gas streams that does not require $SO_2$ removal (FGD) prior to its application. It also utilises existing process technologies already in use for gas cleaning applications. The ability to carry out $CO_2$ capture in the presence of $SO_2$ is extremely desirable from an industrial perspective as it eliminates the need to install FGD equipment (where it is not already installed) to allow a $CO_2$ capture process to be used. In situations where FGD is installed it avoids the installation of additional capacity in existing columns or the use of an additional clean-up step using an additional column. This has significant benefits in terms of reducing cost and the overall technical complexity of applying CCS to flue gas streams that contain $SO_2$.

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A post combustion capture process for removing $CO_2$ and at least one second acid gas from a flue gas stream including the steps of:

providing a flue gas stream containing $CO_2$ in the range of 1 to 30 vol %, and at least one second acid gas to an absorption column, the absorption column having at least separate first and second sections within said absorption column, the gas stream being provided to the first section of the column, providing a solvent comprising an absorbent liquid for $CO_2$ and the second acid gas to the second section to flow counter current to the gas stream, said solvent successively passing through both the second section and the first section of the column, with at least a portion of said solvent being removed from the absorption column once said solvent has passed through the second section and prior to said solvent passing through the first section, passing the gas stream through the absorption column preferentially absorbing the second acid gas into said solvent in the first section of the absorption column before passing to the second section of the absorption column where $CO_2$ is absorbed into said solvent, recovering gas depleted in $CO_2$ and the second acid gas from the second section of the column.

2. The process of claim 1 wherein a liquid flow distributor prevents liquid from flowing directly between the second and first sections of the column while allowing gas to pass through, the solvent from the first section is removed and regenerated, and the regenerated solvent streams are returned to the second section of the absorption column.

3. The process of claim 1 wherein a liquid flow distributor between the first and second section allows liquid to flow directly from the second section to the first section and a portion of the solvent is removed from the column prior to entering the first section of the column.

4. The process of claim 1 wherein the solvent removed prior to the first section is subsequently processed to remove the $CO_2$ before being returned to the absorption column.

5. The process of claim 1 wherein the solvent removed from the absorption column prior to the first section is subsequently processed to remove the second acid gas and then returned to the absorption column.

6. The process of claim 1 wherein at least a portion of the solvent removed from the absorption column prior to the first section is recycled to the top of the first section.

7. The process of claim 1 wherein the second acid gas is selected from the group of $SO_2$, $H_2S$, HF, HCl and $NO_2$.

8. The process of claim 1 wherein the gas stream contains $CO_2$ in the range of 3 to 30 vol %.

9. The process of claim 1 wherein the solvent stream entering the first section of the column has a $CO_2$ content of between 0 and 200% of the saturated $CO_2$ content.

* * * * *